(12) United States Patent
Henry et al.

(10) Patent No.: US 10,259,273 B2
(45) Date of Patent: Apr. 16, 2019

(54) VALVE ASSEMBLY

(71) Applicant: Equalaire Systems, Inc., Corpus Christi, TX (US)

(72) Inventors: Dane Henry, San Antonio, TX (US); Mark Kevin Hennig, Corpus Christi, TX (US)

(73) Assignee: EQUALAIRE SYSTEMS, INC., Corpus Christi, TX (US)

( * ) Notice: Subject to any disclaimer, the term of this patent is extended or adjusted under 35 U.S.C. 154(b) by 165 days.

(21) Appl. No.: 15/317,863

(22) PCT Filed: Jun. 9, 2015

(86) PCT No.: PCT/US2015/034953
§ 371 (c)(1),
(2) Date: Dec. 9, 2016

(87) PCT Pub. No.: WO2015/191621
PCT Pub. Date: Dec. 17, 2015

(65) Prior Publication Data
US 2017/0120696 A1    May 4, 2017

Related U.S. Application Data

(60) Provisional application No. 62/009,803, filed on Jun. 9, 2014.

(51) Int. Cl.
*B60C 23/00* (2006.01)
*F16K 15/20* (2006.01)

(52) U.S. Cl.
CPC ............ *B60C 23/003* (2013.01); *F16K 15/20* (2013.01)

(58) Field of Classification Search
CPC ........ B60C 23/00; B60C 23/003; F16K 15/20
(Continued)

(56) References Cited

U.S. PATENT DOCUMENTS 4,437,504 A * 3/1984 Stumpe ................. B60C 23/003
116/34 R
4,640,331 A * 2/1987 Braun .................... B60C 23/003
137/224

(Continued)

FOREIGN PATENT DOCUMENTS

JP    H05 246218 A    9/1993

OTHER PUBLICATIONS

U.S. Pat. No. 9,132,704 File History.

*Primary Examiner* — Kip T Kotter
(74) *Attorney, Agent, or Firm* — Pizarro Allen PC

(57) ABSTRACT

A valve assembly may have an inlet configured to receive pressurized fluid, a first port, a diaphragm comprising a first side and an opposing second side, a first one-way valve disposed so as to allow fluid to flow from the inlet to the first side of the diaphragm, and a second one-way valve disposed so as to allow fluid to flow from the inlet to the first port. The first side of the diaphragm may be in fluid communication with the first port and with atmosphere, and the second side may be in fluid communication with the first one-way valve, the diaphragm sealing the first port from the first one-way valve and from atmosphere, such that when fluid pressure in the first port exceeds the fluid pressure at the first valve, the diaphragm may flex to allow fluid to flow from the first port to atmosphere.

16 Claims, 17 Drawing Sheets

(58) Field of Classification Search
USPC .......................................................... 152/417
See application file for complete search history.

(56) References Cited

U.S. PATENT DOCUMENTS

| | | | |
|---|---|---|---|
| 4,705,090 A | 11/1987 | Bartos | |
| 4,893,664 A | 1/1990 | Oltean | |
| 7,530,379 B1 | 5/2009 | Becker et al. | |
| 7,669,465 B2 | 3/2010 | Becker | |
| 8,973,633 B2 | 3/2015 | Wilson et al. | |
| 9,132,704 B2 | 9/2015 | Wilson et al. | |
| 9,718,319 B2* | 8/2017 | Knepple | B60C 23/003 |
| 2004/0103939 A1 | 6/2004 | Beau | |
| 2008/0149243 A1* | 6/2008 | Resare | B60C 23/003 152/415 |
| 2009/0266460 A1* | 10/2009 | Resare | B60C 23/003 152/417 |
| 2012/0024445 A1 | 2/2012 | Wilson et al. | |
| 2013/0139911 A1 | 6/2013 | Wilson et al. | |
| 2013/0146193 A1 | 6/2013 | Stephenson | |
| 2014/0224352 A1* | 8/2014 | Racine | B60C 23/003 137/223 |
| 2015/0075642 A1* | 3/2015 | Fazekas | B60C 23/003 137/224 |
| 2015/0090386 A1 | 4/2015 | Lin et al. | |
| 2015/0096655 A1 | 4/2015 | Koulinitch et al. | |
| 2015/0107742 A1 | 4/2015 | Knapke et al. | |
| 2015/0136270 A1 | 5/2015 | Keane | |
| 2015/0144222 A1 | 5/2015 | Wilson et al. | |
| 2015/0165846 A1 | 6/2015 | Sidders et al. | |
| 2015/0174972 A1 | 6/2015 | Zhou et al. | |
| 2015/0202931 A1 | 7/2015 | Honig | |
| 2015/0258863 A1 | 9/2015 | Gillen | |

* cited by examiner

VALVE ASSEMBLY

CROSS-REFERENCE TO RELATED APPLICATION

This application claims priority to U.S. Provisional Patent Application 62/009,803 entitled "Valve Assembly" filed Jun. 9, 2014, which is hereby entirely incorporated herein by reference.

FIELD

The disclosed method and apparatus generally relate to valve assemblies in the field of tire inflation and deflation systems.

BACKGROUND

There exists a need for a method and apparatus for a valve assembly that allows for inflation and deflation of a vehicle tire.

SUMMARY

A valve assembly may comprise a lower block forming a first fluid chamber configured to receive pressurized fluid from a fluid pressure source, a second fluid chamber, and a first port configured for sealed communication with a vehicle tire; a first one-way valve disposed between the first fluid chamber and the second fluid chamber so as to allow fluid communication from the first fluid chamber to the second chamber; a second one-way valve disposed between the first fluid chamber and the first port so as to allow fluid communication from the first fluid chamber to the first port; an upper block forming a third fluid chamber, a first fluid channel in fluid communication with the third fluid chamber, a relief channel in fluid communication with the third fluid chamber and a vent in fluid communication with atmosphere, wherein the relief channel and the vent each terminate at a common surface; and a diaphragm disposed between the upper block and the lower block, the diaphragm having a first side disposed against the common surface so as to substantially seal the relief channel and the vent from fluid communication, and having an opposing second side forming a wall of the second fluid chamber, such that when fluid pressure in the third fluid chamber exceeds fluid pressure in the second fluid chamber, the diaphragm may flex away from the relief channel and the vent so as to allow fluid to flow from the relief channel to the vent.

The lower block may further form a second port configured for sealed communication with a vehicle tire; a third one-way valve may be disposed between the first fluid chamber and the second port so as to allow fluid communication from the first fluid chamber to the second port; the upper block may form a second fluid channel in fluid communication with the third fluid chamber; a fourth one-way valve may be disposed in the first fluid channel so as to allow fluid communication from the first port to the third fluid chamber; and a fifth one-way valve may be disposed in the second fluid channel so as to allow fluid communication from the second port to the third fluid chamber.

A valve body may comprise an inlet configured to receive pressurized fluid; a first port; a diaphragm comprising a first side and an opposing second side; a first one-way valve disposed so as to allow fluid to flow from the inlet to the first side of the diaphragm, and a second one-way valve disposed so as to allow fluid to flow from the inlet to the first port; wherein the first side of the diaphragm is in fluid communication with the first port and with atmosphere, and the second side is in fluid communication with the first one-way valve, the diaphragm sealing the first port from the first one-way valve and from atmosphere, such that when fluid pressure in the first port exceeds the fluid pressure at the first valve, the diaphragm may flex to allow fluid to flow from the first port to atmosphere.

The valve body may further comprise a second port; and a third one-way valve disposed so as to allow fluid to flow from the inlet to the second port, a fourth one-way valve disposed so as to allow fluid to flow from the second one-way valve to a second side of the diaphragm, and a fifth one-way valve disposed so as to allow fluid to flow from the third one-way valve to a second side of the diaphragm; wherein the second side of the diaphragm is also in fluid communication with the fourth and fifth one-way valves, the diaphragm sealing the fourth and fifth one-way valves from the first one-way valve and from atmosphere, such that when fluid pressure in the fourth or fifth one-way valves exceeds the fluid pressure at the first valve, the diaphragm may flex to allow fluid to flow from the fourth or fifth one-way valve to atmosphere.

A rotary union may comprise a tubular member and a valve body sealingly connected to and rotatable with respect to the tubular member. The valve body may comprise an inlet configured to receive pressurized fluid, a first port, a diaphragm comprising a first side and an opposing second side, a first one-way valve disposed so as to allow fluid to flow from the inlet to the first side of the diaphragm, and a second one-way valve disposed so as to allow fluid to flow from the inlet to the first port. The first side of the diaphragm may be in fluid communication with the first port and with atmosphere, and the second side may be in fluid communication with the first one-way valve, the diaphragm sealing the first port from the first one-way valve and from atmosphere, such that when fluid pressure in the first port exceeds the fluid pressure at the first valve, the diaphragm may flex to allow fluid to flow from the first port to atmosphere.

The rotary union may further comprise a second port, a third one-way valve disposed so as to allow fluid to flow from the inlet to the second port, a fourth one-way valve disposed so as to allow fluid to flow from the second one-way valve to a second side of the diaphragm, and a fifth one-way valve disposed so as to allow fluid to flow from the third one-way valve to a second side of the diaphragm. The second side of the diaphragm may also be in fluid communication with the fourth and fifth one-way valves, the diaphragm sealing the fourth and fifth one-way valves from the first one-way valve and from atmosphere, such that when fluid pressure in the fourth or fifth one-way valves exceeds the fluid pressure at the first valve, the diaphragm may flex to allow fluid to flow from the fourth or fifth one-way valve to atmosphere.

A vehicle tire inflation system may comprise a pressurized fluid source, a rotary union in sealed fluid communication with the pressurized fluid source, the rotary union comprising a tubular member and a valve body sealingly connected to and rotatable with respect to the tubular member. The valve body may comprise an inlet configured to receive pressurized fluid, a first port, a diaphragm comprising a first side and an opposing second side, a first one-way valve disposed so as to allow fluid to flow from the inlet to the first side of the diaphragm, and a second one-way valve disposed so as to allow fluid to flow from the inlet to the first port. The first side of the diaphragm may be in fluid communication with the first port and with atmosphere, and the second side may be in fluid communication with the first one-way valve, the diaphragm sealing the first port from the first one-way valve and from atmosphere, such that when fluid pressure in the first port exceeds the fluid pressure at the first valve, the diaphragm may flex to allow fluid to flow from the first port to atmosphere. The system may further comprise a first air hose providing a sealed fluid connection between the first port and a first tire of the vehicle.

The vehicle tire inflation system may further comprise a second port, a third one-way valve disposed so as to allow fluid to flow from the inlet to the second port, a fourth one-way valve disposed so as to allow fluid to flow from the second one-way valve to a second side of the diaphragm, and a fifth one-way valve disposed so as to allow fluid to flow from the third one-way valve to a second side of the diaphragm. The second side of the diaphragm may also be in fluid communication with the fourth and fifth one-way valves, the diaphragm sealing the fourth and fifth one-way valves from the first one-way valve and from atmosphere, such that when fluid pressure in the fourth or fifth one-way valves exceeds the fluid pressure at the first valve, the diaphragm may flex to allow fluid to flow from the fourth or fifth one-way valve to atmosphere. The system may further comprise a second air hose providing a sealed fluid connection between the second port and a second tire of the vehicle.

A valve assembly may comprise a lower block forming a first fluid chamber configured to receive pressurized fluid from a fluid pressure source, a second fluid chamber, and a first port. A first one-way valve may be disposed between the first fluid chamber and the second fluid chamber so as to allow fluid communication from the first fluid chamber to the second chamber. A first port assembly may have a first tire end configured for sealed communication with a vehicle tire, and a first port end configured for sealed communication with the first port. The first port assembly may comprise a first port body, a first port channel, a first port vent and a second one-way valve. The second one-way valve may be disposed in the first port channel so as to allow fluid communication through the first port channel from the first port end toward the first tire end and first port vent. An upper block may form a third fluid chamber, a first fluid channel in fluid communication with the third fluid chamber, a relief channel in fluid communication with the third fluid chamber and a vent in fluid communication with atmosphere, wherein the relief channel and the vent each terminate at a common surface. A diaphragm may be disposed between the upper block and the lower block, the diaphragm having a first side disposed against the common surface so as to substantially seal the relief channel and the vent from fluid communication, and having an opposing second side forming a wall of the second fluid chamber, such that when fluid pressure in the third fluid chamber exceeds fluid pressure in the second fluid chamber, the diaphragm may flex away from the relief channel and the vent so as to allow fluid to flow from the relief channel to the vent.

The valve assembly may further comprise a second port. The second port assembly may have a second tire end configured for sealed communication with a vehicle tire, and a second port end configured for sealed communication with the second port. The second port assembly may comprise a second port body, a second port channel, a second port vent and a third one-way valve. The third one-way valve may be disposed in the second port channel so as to allow fluid communication through the second port channel from the second port end toward the second tire end and second port vent. The upper block may form a second fluid channel in fluid communication with the third fluid chamber, a fourth one-way valve disposed in the first fluid channel so as to allow fluid communication from the first port vent to the third fluid chamber, and a fifth one-way valve disposed in the second fluid channel so as to allow fluid communication from the second port vent to the third fluid chamber.

A port assembly may comprise a port body having a port channel and a port vent, and a one way valve disposed in the port channel so as to allow fluid to flow through the port channel and port vent.

A rotary union assembly may comprise a body having a fluid channel and one or more vents, the body having an end configured to abut a one-way valve. The rotary union may be disposed in the fluid channel.

DETAILED DESCRIPTION

Figure 1:
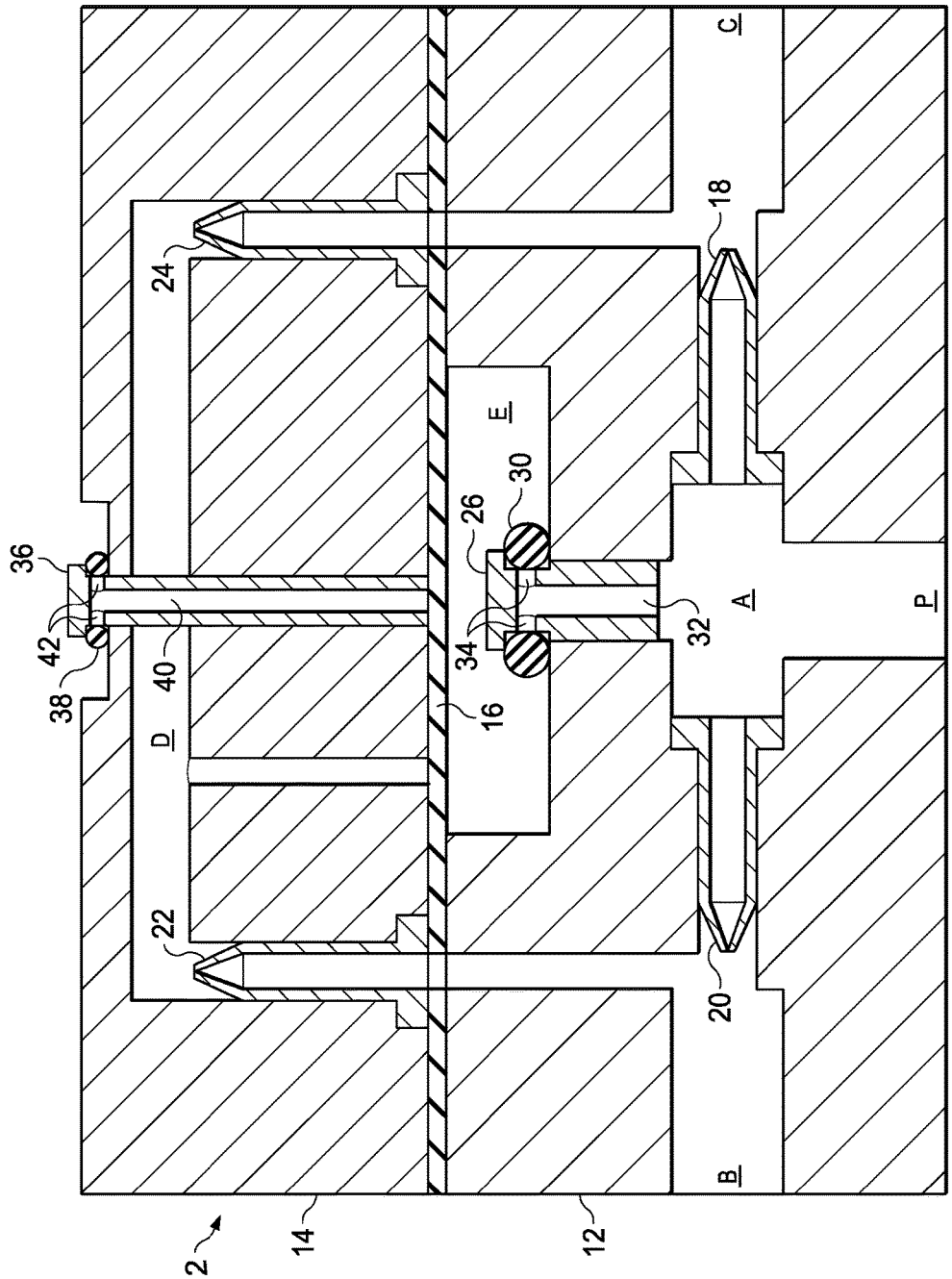
FIG. 1 illustrates one embodiment of a multi-port valve assembly comprising an upper block, a lower block, a diaphragm, and a plurality of one-way valves.

A vehicle tire inflation system may include a valve assembly to allow for inflation and deflation of a vehicle tire. As by now known in the art, a vehicle tire inflation system may comprise a fluid pressure source, such as a tank of compressed air, in sealed fluid communication with one or more vehicle tires through a rotary union.

A valve assembly may be provided as part of the tire inflation system, for example, as a separate component or as part of a rotary union assembly. As may be seen in the embodiment of FIG. 1, a valve assembly 2 (seen in cross-section view) may comprise a lower block 12 and an upper block 14. A diaphragm 16 may be disposed between the lower block and the upper block. One or more one-way valves 18, 20, 22, 24 may be disposed in various fluid channels of the valve assembly. One-way valves 18, 20, 22, 24 may comprise a flexible material and configuration, such as an elastomeric duck-bill valve. A first vehicle tire (not shown) may be disposed in sealed fluid communication with port B, and a second vehicle tire (not shown) may be disposed in sealed fluid communication with port C.

In some embodiments, a one-way valve 26 may be disposed between a fluid chamber A and fluid chamber E so as to allow a pressurizing fluid to flow from the fluid chamber A to the fluid chamber E. In one embodiment, the one-way valve 26 may comprise an elastomeric gland, such as an o-ring 30, disposed about a fluid channel 32 and covering orifices 34 formed in the fluid channel. Fluid channel 32 may be in full fluid communication with fluid chamber A. When the fluid pressure in fluid chamber E is lower than the fluid pressure in fluid chamber A, pressurizing fluid from the fluid channel 32 may urge the gland 30 away from the orifices 34, thus allowing fluid to flow from fluid chamber A through the orifices 34 into the fluid chamber E.

In some embodiments, a one-way valve 36 may be disposed about a vent 40 so as to allow fluid to flow from the valve assembly 2 to atmosphere without allowing environmental contaminants to flow into the valve assembly 2. The one-way valve 36 may comprise an elastomeric gland, such as an o-ring 38, disposed about the vent 40 and covering orifices 42 formed in the vent 40. As described in further detail below, when the fluid pressure in fluid chamber E is lower than the fluid pressure in a vehicle tire (not shown), pressurizing fluid from the tire may flow through the vent 40 and urge the gland 38 away from the vent orifices, thus allowing fluid to flow from the vent 40 through the orifices 42 out to atmosphere.

Figure 2:
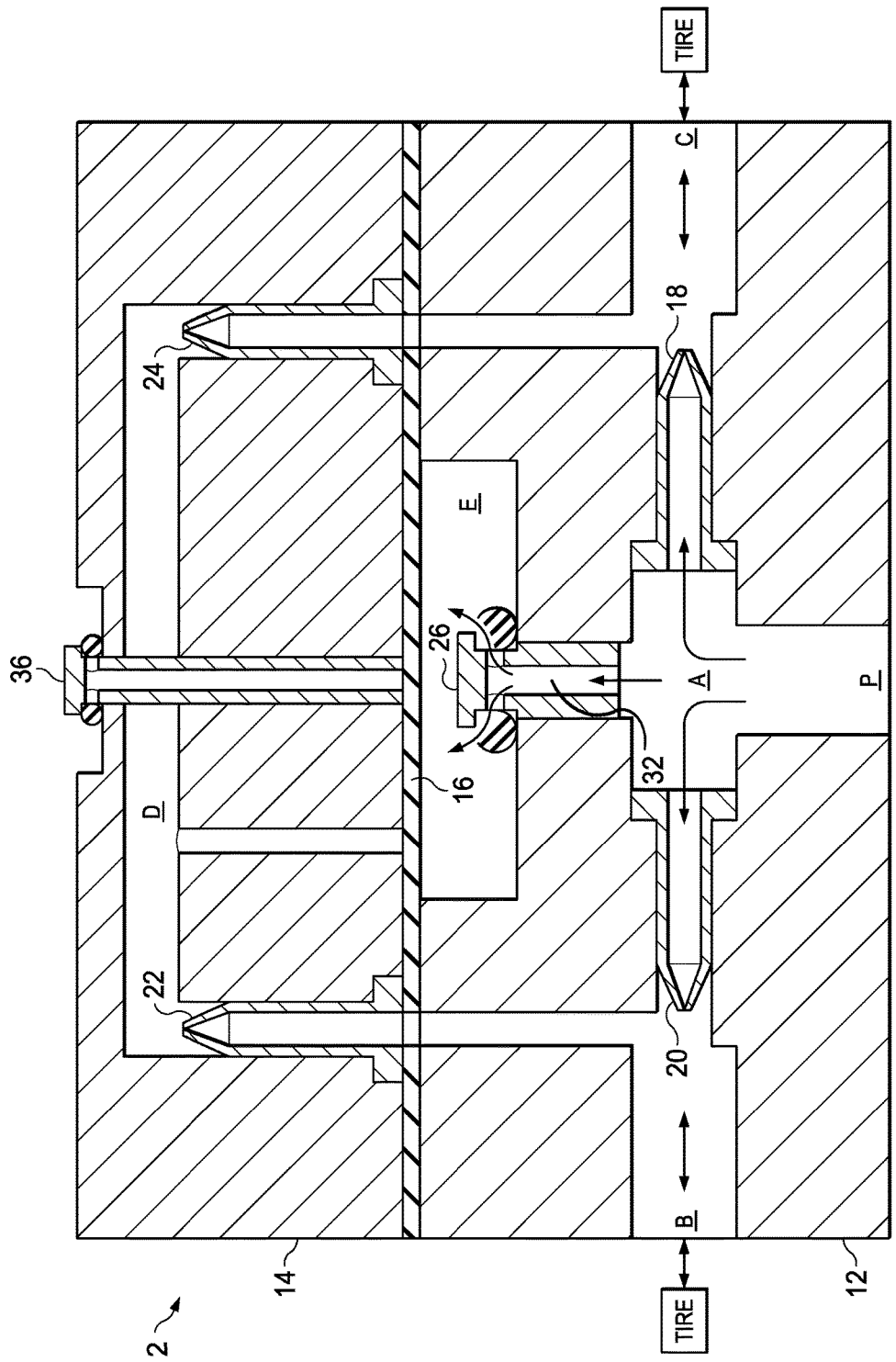
FIG. 2 illustrates exemplary fluid flow through the valve assembly of FIG. 1.
Figure 3:
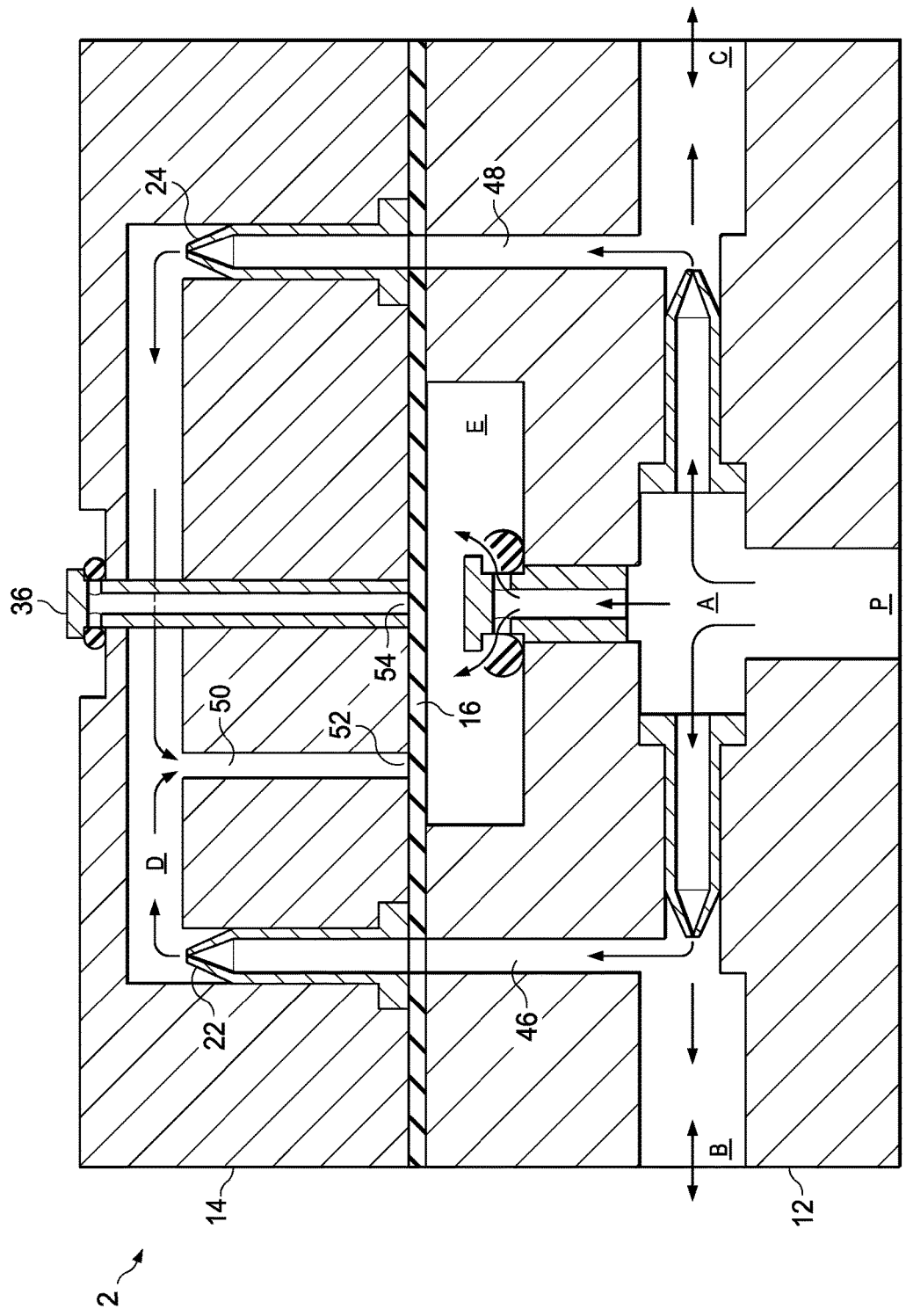
FIG. 3 illustrates further exemplary fluid flow through the valve assembly of FIG. 1.
Figure 4:
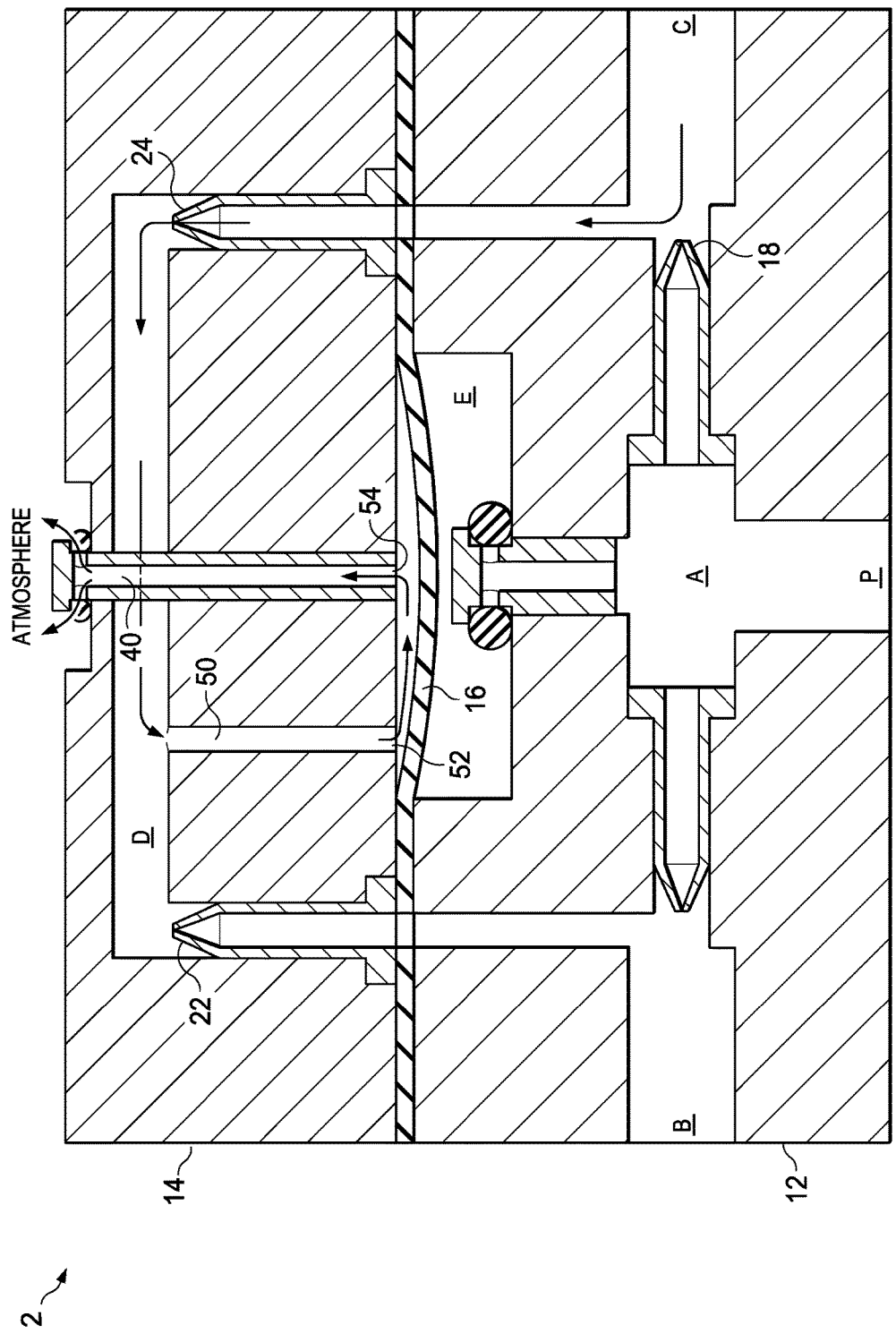
FIG. 4 illustrates yet further exemplary fluid flow through the valve assembly of FIG. 1.

Operation of the valve assembly 2 of FIG. 1 may be understood with reference to FIGS. 2-4. As may be seen in FIG. 2, pressurized fluid may flow at an inlet P into the fluid chamber A from a fluid source (not shown), such as the fluid pressure source for an automatic tire inflation system. If the fluid pressure in fluid chamber E is lower than the fluid pressure in fluid channel 32, then the fluid may flow into fluid chamber E through the one-way valve 26.

Because one-way valves 18 and 20 allow fluid to flow from fluid chamber A to ports C and B, respectively, the fluid pressure in ports C and B tends to substantially equalize with the fluid pressure in fluid chamber A. Depending on the stiffness and configuration of the one-way valves 18 and 20, the fluid pressures in ports C and B and in fluid chamber A may be substantially equal, e.g., within ±2 psi.

Similarly, because one-way valve 26 allows fluid to flow from fluid chamber A to fluid chamber E, the fluid pressure in fluid chamber E tends to substantially equalize with the fluid pressure in fluid chamber A. Depending on the material properties and configuration of the one-way valve 26, the fluid pressures in fluid chamber E and in fluid chamber A may be substantially equal, e.g., within ±2 psi.

If the fluid pressure in ports B and C is lower than the fluid pressure in chamber A, then pressurized fluid from the fluid source may flow into chamber A, through the one-way valves 18 and 20, and into ports C and B, respectively, and from those ports to the tires (not shown), thus inflating the tires to the pressure of the fluid provided to the fluid chamber A. Similarly, if the fluid pressure in fluid chamber E is lower than the fluid pressure in chamber A, then pressurized fluid from fluid channel 32 may flow into chamber E, through the one-way valve 26.

Thus, if vehicle tires are in fluid communication with ports C and B, pressurized fluid may be provided to fluid chamber A at a pressure suitable for proper tire inflation. If the vehicle tires are under-inflated or at a pressure lower than the pressure of fluid provided in fluid chamber A, then pressurizing fluid may flow from fluid chamber A through one-way valves 18 and 20, into the vehicle tires through ports C and B, respectively.

As may be seen in FIG. 3, pressurizing fluid may also flow from ports B and C into fluid channels 46 and 48, respectively, and through one-way valves 22 and 24, respectively, into fluid chamber D. Thus, the fluid pressure in fluid chamber D tends to substantially equalize with the fluid pressure in ports C and B. Depending on the stiffness and configuration of the one-way valves 22 and 24, the fluid pressures in ports C and B, and in fluid chamber D may be substantially equal, e.g., within ±2 psi.

Fluid chamber D may be in fluid communication with diaphragm 16 through relief channel 50. Diaphragm 16 may thus serve as a flexible barrier between fluid chamber E and the relief channel 50. If the fluid pressure in fluid chamber E is greater than or substantially equal to the fluid pressure in relief channel 50, then the diaphragm may seal the relief channel outlet 52 and vent inlet 54.

Under some circumstances, however, the fluid pressure in chamber D may exceed the fluid pressure in chamber E. Such circumstance may arise, for example, if a vehicle tire is over-inflated. Over-inflation may occur from, for example, elevation changes and temperature changes, such as by absorbing radiant energy (e.g., the tire is exposed to sunlight) and normal road use. If the tires are in two-way fluid communication with the valve assembly, then increased tire pressure will result in similarly increased pressure at ports B and C. The one-way valves 18 and 20 will prevent over-pressurized fluid from returning to fluid chamber A. However, one-way valves 22 and 24 will allow over-pressurized fluid to flow into chamber D.

For example, as may be seen in FIG. 4, if a tire in two-way fluid communication with port C is over-inflated (perhaps as a result of sitting in the sun), then the fluid pressure in port C will similarly increase. Thus, port C will contain fluid at a greater pressure than the fluid in chamber A. The one-way valve 18 will prevent fluid from flowing to chamber A. The one-way valve 24 will allow pressurized fluid to flow into chamber D, thus raising the pressure in chamber D above that of chamber A (and fluid chamber E, which may be at a substantially equal pressure as fluid chamber A). The one-way valve 22 may prevent pressurized fluid from flowing from chamber D into port B. Relief channel 50 may then communicate that pressure to diaphragm 16, which may, due to the pressure differential between fluid chambers D and E, flex away from relief channel outlet 52 and vent inlet 54, thus allowing fluid communication between the relief channel 50 and the vent 40. Fluid may flow from the relief channel 50 to the vent 40 and out to atmosphere until the pressure in chamber D and the pressure in chamber E equalize sufficiently to allow the diaphragm to return to its original position, sealing the relief channel outlet 52. Thus, the diaphragm 16 may allow for excess fluid pressure in a tire to be released through the vent 40 until the tire fluid pressure decreases to approximately the pressure in chamber A (the pressure of the fluid source).

Figure 5:
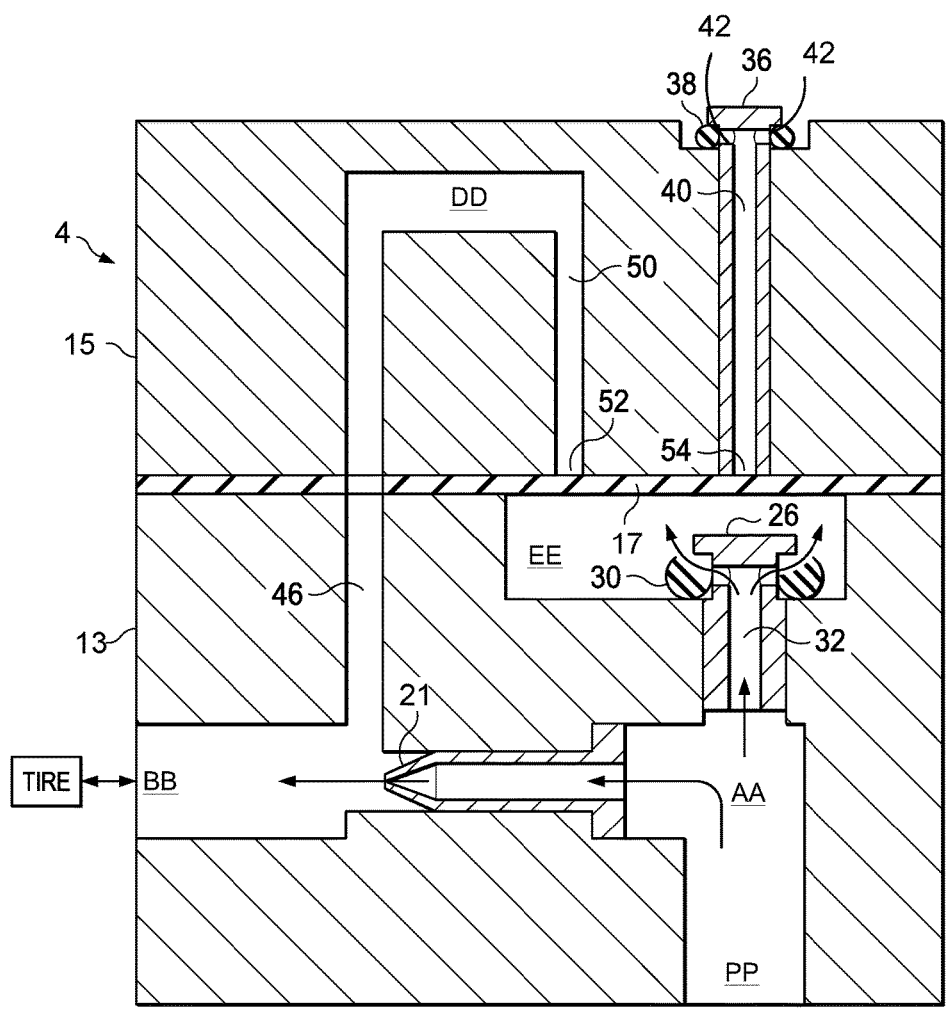
FIG. 5 illustrates one embodiment of a single-port valve assembly comprising an upper block, a lower block, a diaphragm, and a plurality of one-way valves.
Figure 6:
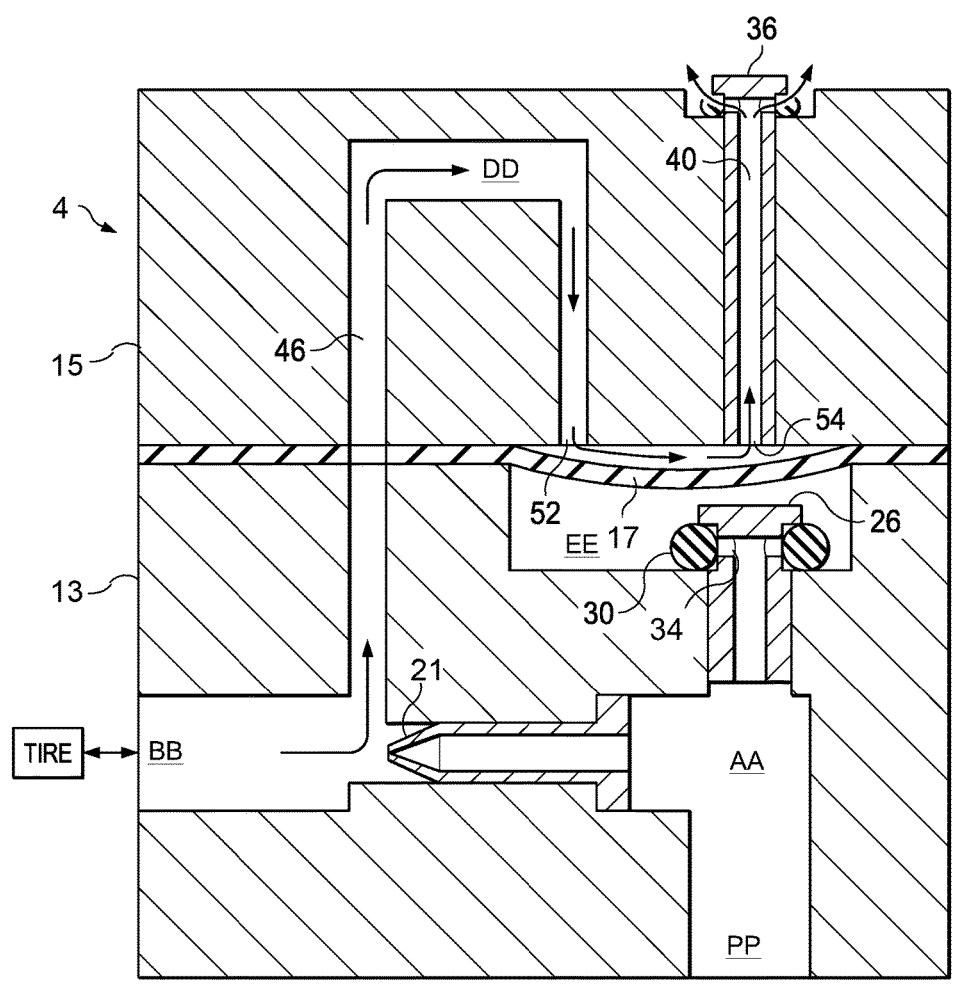
FIG. 6 illustrates exemplary fluid flow through the valve assembly of FIG. 5.

As may be seen in FIGS. 5-6, a valve assembly may also be suitable configured for use with a single tire, such as a super single. A valve assembly 4 may comprise a lower block 13 and an upper block H block 15. A diaphragm 17 may be disposed between the lower block and the upper block. A one-way valve 21 may be disposed in various fluid channels of the valve assembly. One-way valve 21 may comprise a flexible material and configuration, such as an elastomeric duck-bill valve. A single vehicle tire (not shown) may be disposed in sealed fluid communication with port BB.

In some embodiments, a one-way valve 26 may be disposed between a fluid chamber AA and fluid chamber EE so as to allow a pressurizing fluid to flow from the fluid chamber AA to the fluid chamber EE. The one-way valve 26 may comprise an elastomeric gland, such as an o-ring 30, disposed about a fluid channel 32 and covering orifices 34 formed in the fluid channel. Fluid channel 32 may be in full fluid communication with fluid chamber AA. When the fluid pressure in fluid chamber EE is lower than the fluid pressure in fluid chamber AA, pressurizing fluid from the fluid channel 32 may urge the gland 30 away from the orifices 34, thus allowing fluid to flow from fluid chamber AA through the orifices 34 into the fluid chamber EE.

In some embodiments, a one-way valve 36 may be disposed about a vent 40 so as to allow fluid to flow from the valve assembly 10 to atmosphere without allowing environmental contaminants to flow into the valve assembly 10. The one-way valve 36 may comprise an elastomeric gland, such as an o-ring 38, disposed about the vent 40 and covering orifices 42 formed in the vent. In other embodiments, the one-way valve 36 may comprise an elastomeric duck-bill valve.

As with the multiple-port embodiment described above, operation of the single-port valve assembly may be understood with reference to FIGS. 5 and 6. As may be seen in FIG. 5, pressurized fluid may flow into the fluid chamber AA from a fluid source, such as the pressure source for an automatic tire inflation system. If the fluid pressure in fluid chamber AA is lower than the fluid pressure in fluid channel 32, then the fluid may flow into fluid chamber AA through the one-way valve 26.

The fluid pressure in port BB tend to substantially equalize with the fluid pressure in fluid chamber AA through the one-way valve 21. Similarly, because one-way valve 26 allows fluid to flow from fluid chamber AA to fluid chamber EE, the fluid pressure in fluid chamber EE tends to substantially equalize with the fluid pressure in fluid chamber AA.

If the fluid pressure in port BB is lower than the fluid pressure in chamber AA, then pressurized fluid from the fluid source may flow from chamber AA, through the one-way valve 21, and into port BB, and from that port to the tire, thus inflating the tire to the pressure of the fluid provided through the fluid channel 32. Similarly, if the fluid pressure in fluid chamber EE is lower than the fluid pressure in chamber AA, then pressurized fluid from fluid channel 32 may flow into chamber EE, through the one-way valve 26.

Thus, if the vehicle tire is under-inflated or at a pressure lower than the pressure of fluid provided in fluid chamber AA, then pressurizing fluid may flow from fluid chamber AA through one-way valve 21, into the vehicle tire through port BB. Pressurizing fluid may also flow from port B into fluid channel 46, and into fluid chamber DD. Thus, the fluid pressure in fluid chamber DD tends to substantially equalize with the fluid pressure in port BB.

Fluid chamber DD may be in fluid communication with diaphragm 17 through relief channel 50. diaphragm 17 may thus serve as a flexible barrier between fluid chamber EE and the relief channel 50. If the fluid pressure in fluid chamber EE is greater than or substantially equal to the fluid pressure in relief channel 50, then the diaphragm may seal the relief channel outlet 52 and vent inlet 54.

Under some circumstances, however, the fluid pressure in chamber DD may exceed the fluid pressure in chamber EE. If the tire is in two-way fluid communication with the valve assembly, then increased tire pressure will result in similarly increased pressure at port BB. The one-way valve 20 will prevent over-pressurized fluid from returning to fluid chamber AA.

As may be seen in FIG. 6, if a tire in two-way fluid communication with port BB is over-inflated (perhaps as a result of sitting in the sun), then port BB will contain fluid at a greater pressure than the fluid in fluid chambers AA and EE. The one-way valve 21 will prevent fluid from flowing to chamber AA. Pressurized fluid may flow into chamber DD, thus raising the pressure in chamber DD above that of chamber EE. Relief channel 50 may then communicate that pressure to diaphragm 17, which may, due to the pressure differential between fluid chambers DD and EE, flex away from relief channel outlet 52 and vent inlet 54, thus allowing fluid communication between the relief channel 50 and the vent 40. Fluid may flow from the relief channel 50 to the vent 40 and out to atmosphere until the pressure in chamber DD and the pressure in chamber EE equalize sufficiently to allow the diaphragm to return to its original position, sealing the relief channel outlet 52. Thus, the diaphragm 17 may allow for excess fluid pressure in a tire to be released through the vent 40 until the tire fluid pressure decreases to approximately the pressure in chamber AA (the pressure of the fluid source).

As may be seen in FIG. 6, and also similarly as described above, when the fluid pressure in fluid chamber EE is lower than the fluid pressure in a vehicle tire (not shown) connected to port BB, pressurizing fluid from the tire may flow through the vent 40 and urge the gland away from the vent orifices, thus allowing fluid to flow from the vent 40 through the orifices 42 out to atmosphere.

The valve assembly upper block and lower block may be assembled using conventional fasteners, such as threaded fasteners, locks, clamps, or may be joined by any suitable means. The diaphragm may be retained between the upper and lower block by friction fit, clamp ring, or any other suitable means. In the disclosed embodiment the diaphragm may comprise an elastomeric sheet clamped between the upper block and the lower block of the valve assembly. In other embodiments, a valve assembly may comprise a unitary block having a diaphragm, fluid channels and valves disposed therein as described above.

Figure 7:
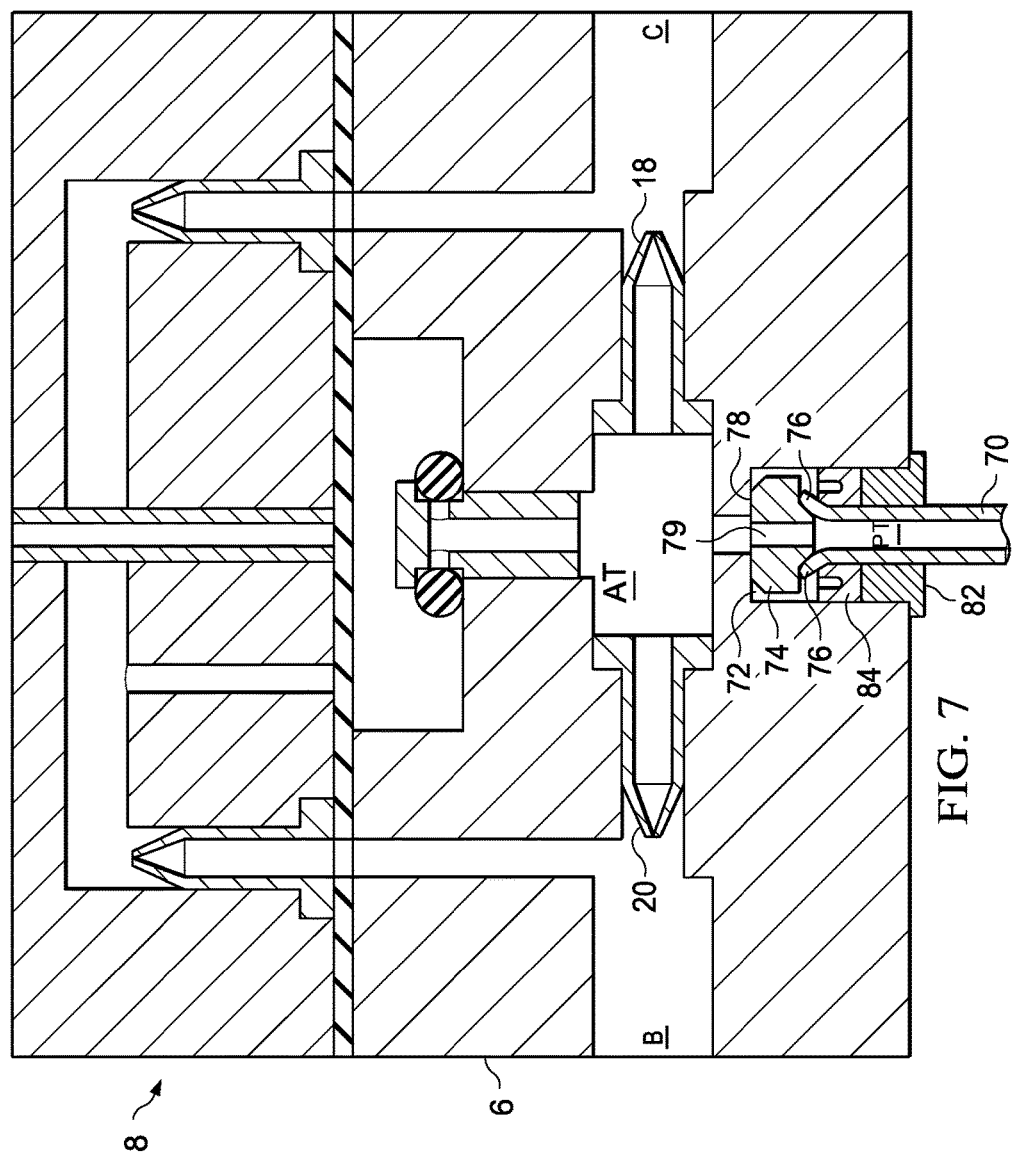
FIG. 7 illustrates one embodiment of a rotary union comprising a multi-port valve assembly and circumferential seal.

In yet further embodiments, the valve assembly may comprise a portion of a rotary union or rotary air connection for a tire inflation system. For example, as may be seen in FIG. 7, a rotary air connection may be provided as generally described in U.S. Pat. No. 6,698,482, which is incorporated herein fully by reference. A valve body 6 may have a tubular member 70 disposed in an inlet 72. The tubular member 70 may rotate with respect to the valve body 6. A bearing 74 may be disposed between an end 76 of the tubular member 70 and a face 78 of the inlet. A fluid channel 79 in the bearing 74 may allow pressurized fluid to flow from the tubular member 70 into the fluid chamber AT. A seal 84, such as an o-ring or lip seal, may be disposed about the tubular member 70 so as to seal the tubular member 70 and valve body 12. A cap 82 may be disposed in the inlet about the tubular member 70 so as to retain the end 76 of the tubular member 70 and bearing 74 in the valve body. The tubular member 70 may be rigid, flexible, or a combination of rigid and flexible member.

Figure 8:
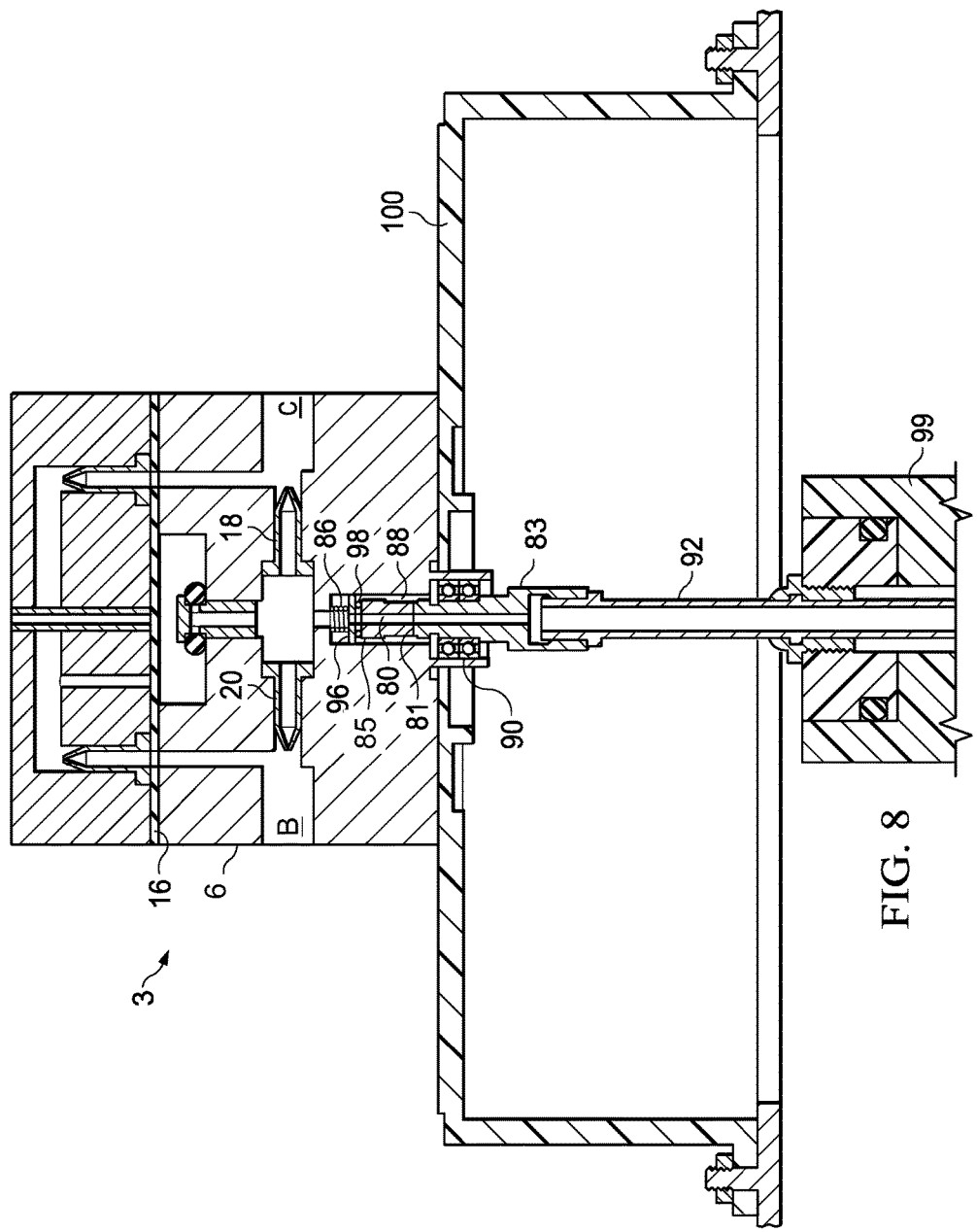
FIG. 8 illustrates one embodiment of a rotary union comprising a multi-port valve assembly and a face seal.

A valve assembly (whether for one or more vehicle tires) as described herein may be used in connection with any other rotary air connection suitable for a vehicle tire inflation system. For example, as may be seen in FIG. 8, a face seal 80 may be provided in connection with the valve body 3, such as the face seal disclosed in U.S. Pat. No. 6,105,645, which is incorporated herein fully by reference. The rotary union may comprise a rigid tubular member 83, a graphite member 85 and a spring 86. The spring 86 and graphite member 84 may be disposed in an inlet 88 of the valve body 12. The spring 86 may urge the graphite member 85 against the rigid tubular member 83, thereby forming a face seal 80. Bearings 90 may allow the valve body 12 to rotate with respect to the rigid tubular member 83. The rigid tubular member 83 may be sealingly connected to a flexible tubular member 92, which may in turn be sealingly connected to a fluid source in an axle 99. Pressurized fluid may flow through the flexible tubular member 92, rigid tubular member, graphite member 85 and spring 86 into fluid chamber A. Fluid may flow through the valve body 3 from fluid chamber A as described above. The rigid member 82 may comprise metal, plastic or ceramic. A washer 96 and o-ring 98 may be disposed between the spring 86 and graphite member 85. The valve body 3 may be mounted to the exterior of a hubcap 100. Ports B and C may each be sealingly connected to a vehicle tire.

Figure 9A:
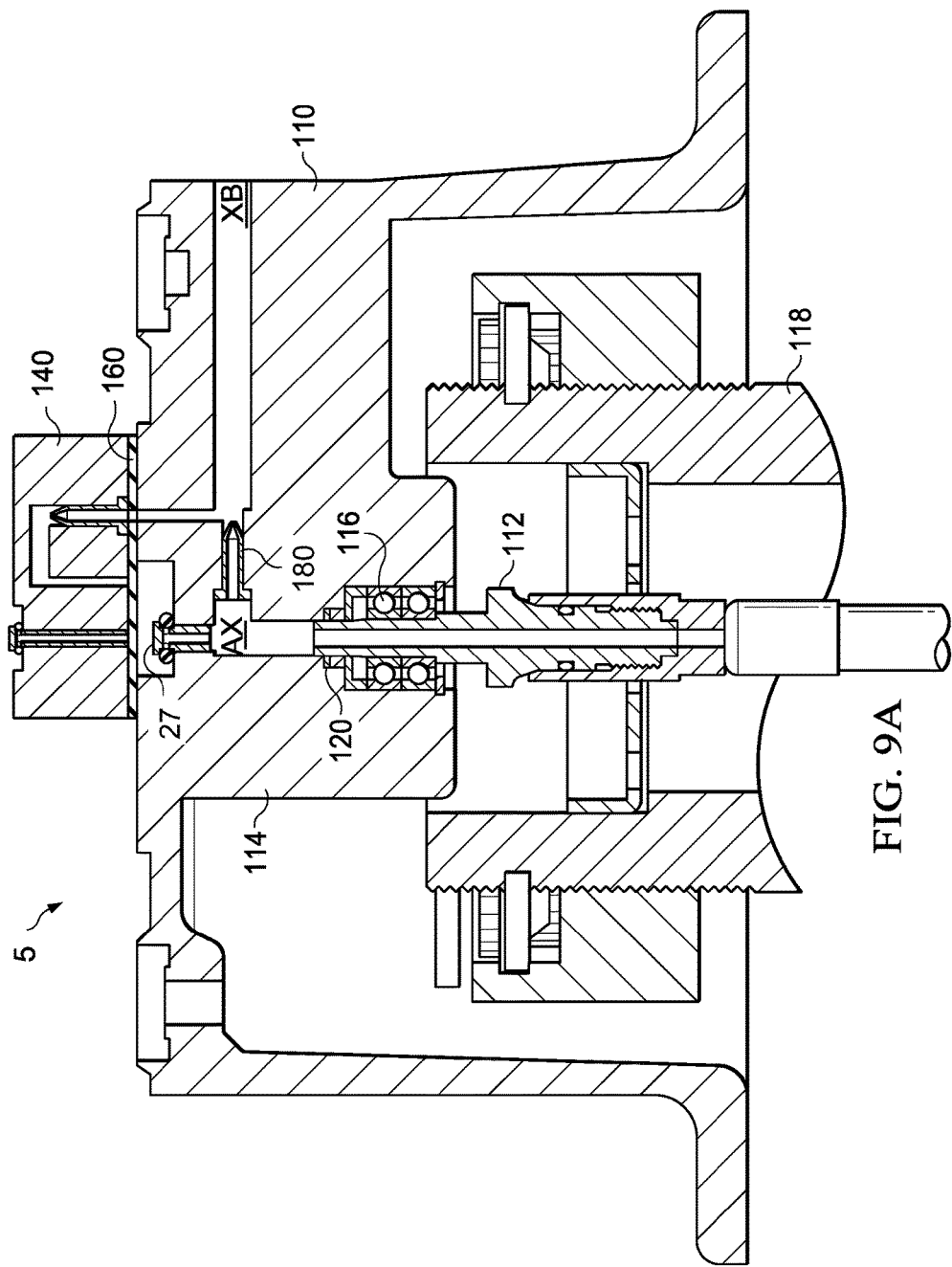
FIG. 9A illustrates one embodiment of a hub cap having an integrated rotary union and single-port valve assembly.
Figure 9B:
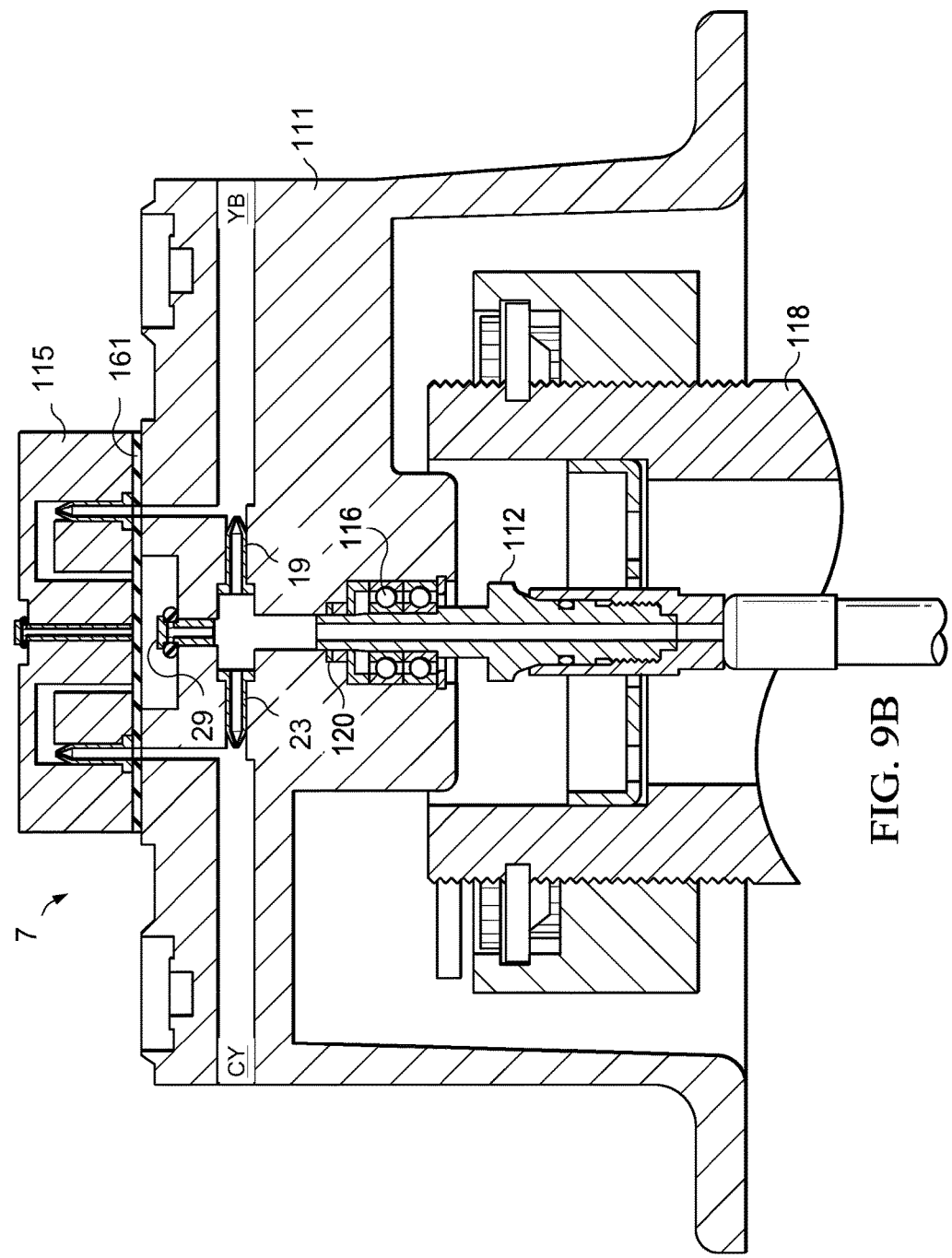
FIG. 9B illustrates one embodiment of a hub cap having an integrated rotary union and multi-port valve assembly.

Similarly, as may be seen in FIGS. 9A and 9B, the valve assembly 5 may be incorporated into a hub cap rotary union, such as the rotary connection of U.S. Pat. No. 8,505,600, which is incorporated herein fully by reference. In the embodiments of FIGS. 9A and 9B, a hub cap 110 may comprise a rotary union stem 112 rotatably mounted to a hub cap boss 114 by bearings 116. An elastomeric seal 120, such as a lip seal, may seal the rotary union stem 112 with respect to the hubcap. The rotary union stem 112 may be in sealed fluid communication with a fluid source. Pressurized fluid may flow from the pressurized fluid source in the axle 118 through the rotary union stem into the fluid chamber AX. Fluid may flow through the valve assembly 5 from fluid chamber AX as described above. In the embodiment of FIG. 9A, port XB may be sealingly connected to a first vehicle tire. In the embodiment of FIG. 9B, a second port CY may be provided as described herein, and be sealingly connected to a second vehicle tire. One-way valves 19, 23, and 29 may comprise elastomeric duck bill valves (as with one-way valve 19, 23), or may comprise elastomeric ring-shaped glands (as with one-way valves 29) or any other suitable one-way valve.

In other embodiments, a valve assembly (whether for single or multiple vehicle tires) may be similarly incorporated into a hubcap rotary union, such as the rotary union disclosed in applicant's PCT App. Ser. No. PCT/2014/061879 filed Oct. 23, 2014, the disclosure of which is incorporated wholly herein by reference.

Use of flexible one-way valves and a diaphragm may allow better equalization of fluid pressures in the fluid chambers and ports described herein than that permitted by use of metallic or non-elastomeric valves, such as Schraeder valves. Such valves may comprise elastomeric duck-bill configuration of, e.g., silicon or rubber, or may comprise the o-ring glands or annular seals covering orifices as described herein.

Figure 10:
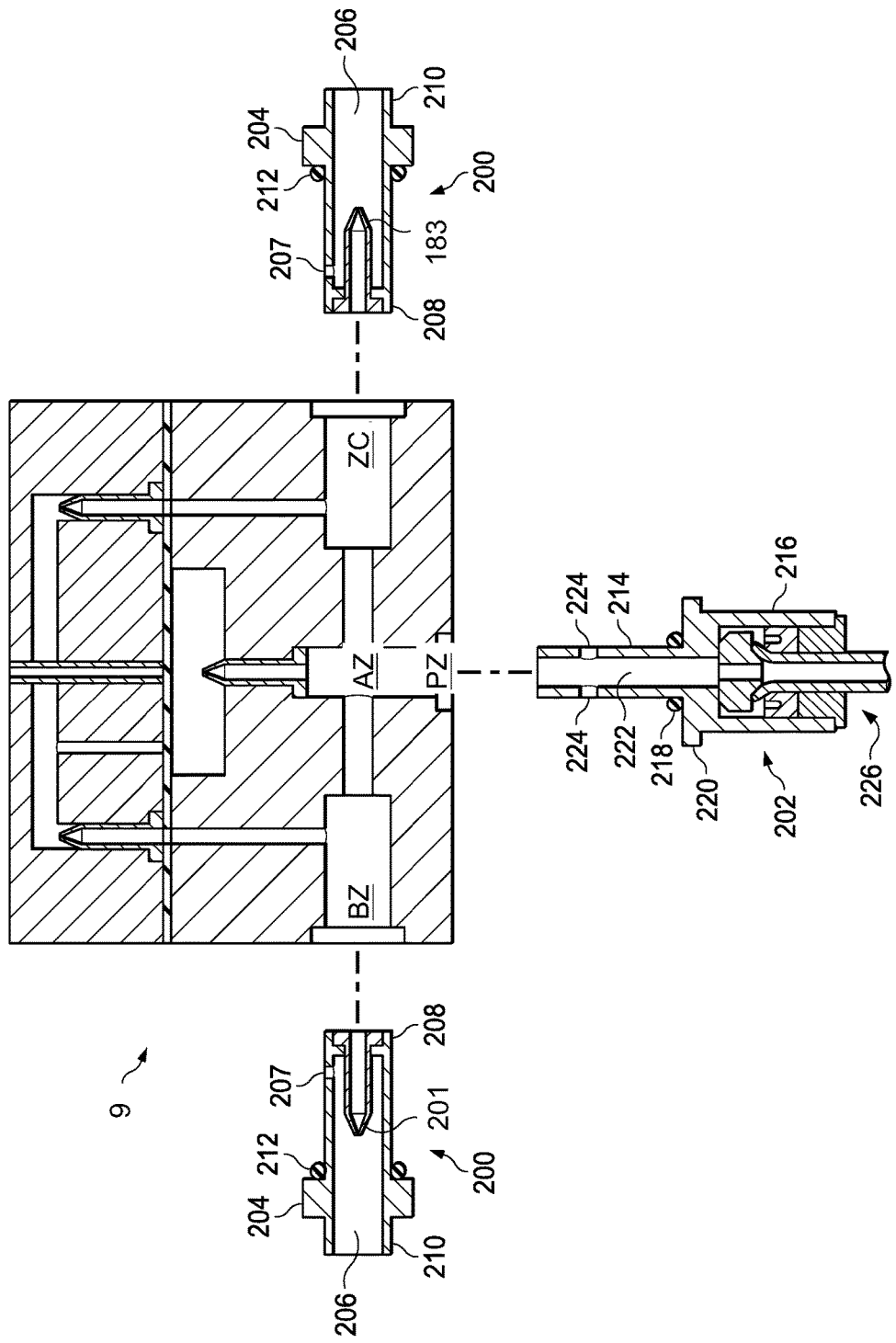
FIG. 10 illustrates an exploded view of one embodiment of a valve assembly comprising one or more port assemblies and a rotary union assembly.

As may be further seen in the embodiment of FIG. 10, a valve assembly 9 may comprise one or more port assemblies 200 and a rotary union assembly 202. A port assembly 200 may comprise a port body 204 having a port channel 206 disposed therein. A one-way valve 183 or 201 may be disposed in the port channel 206. A port vent 207 may allow fluid from the port channel to flow from the port body 204. The port body 204 may comprise a port end 208 and a hose end 210. The port end may be threaded for removable connection to valve assembly 10, e.g., at ports BZ and ZC. An elastomeric seal 212, such as an o-ring, may be disposed about the outer circumference of the port body so as to provide sealed connection between the valve assembly 9 and the port assembly 200. The hose end 210 may be suitably configured, such as by screw threads, for fluid-tight connection to a fluid conduit in fluid communication with a pneumatic tire (not shown).

The rotary union assembly 202 may comprise a valve end 214 and a hub end 216. The rotary union assembly 202 may comprise a pressure body 220 having a pressure channel 222 disposed therein. The valve end may be configured, e.g., with screw threads, for removable connection to valve assembly 9 at an inlet PZ to fluid chamber AZ. The hub end 216 may be configured, e.g., with screw threads, for removable connection to a hub cap (not shown). An elastomeric seal 218, such as an o-ring, may be disposed about the outer circumference of the rotary union body so as to provide sealed connection between the valve assembly 9 and the rotary union assembly 202. One or more pressure vents 224 may allow fluid from the pressure channel to flow from the pressure body 220. The rotary union assembly may further comprise any suitable rotary union 226, such as a rotary union of the type shown in FIG. 7.

Figure 11:
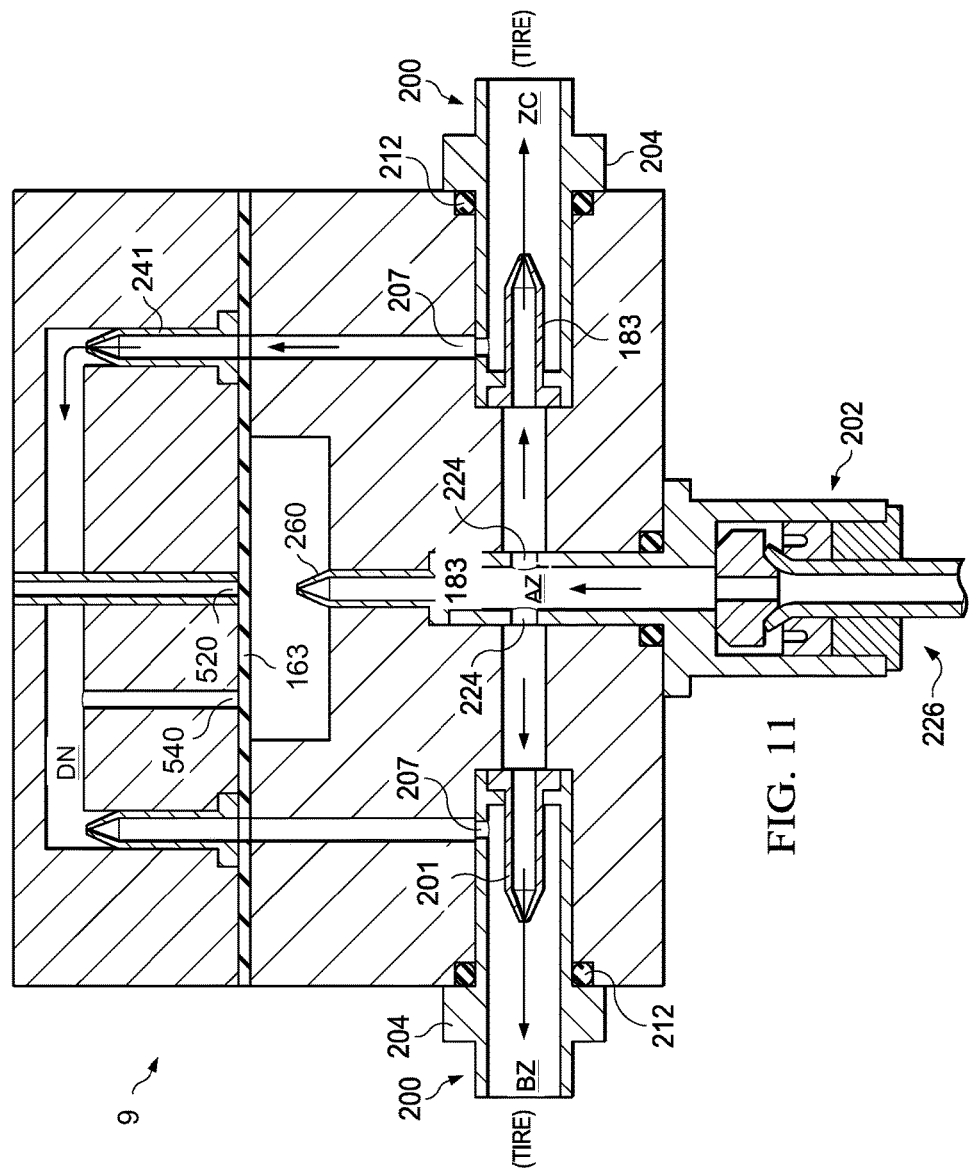
FIG. 11 illustrates the embodiment of FIG. 10 as assembled.

As may be seen in the embodiment of FIG. 11, when the port assemblies 200 and rotary union assembly 202 are assembled to the valve assembly 9. So assembled, the port assemblies 200 and rotary union 202 assembly form fluid flow paths similar to that of the embodiment of FIG. 1. Furthermore, rotary union assembly 226 may serve to retain one-way valve 260 in the valve assembly 9. For example, pressurized fluid may flow from a fluid source through the rotary union assembly 226 into the fluid chamber AZ through the pressure vents 224. Pressurized fluid may flow from the fluid chamber AZ through the one-way valves 183 and 201 to ports ZC and BZ, respectively, and from there to the tires (not shown). If, for example, a tire in fluid connection with port ZC was over-pressurized at an air pressure higher than the fluid pressure at in fluid chamber AZ, then fluid may flow from the tire through port vent 207 and through one-way valve 241 as described in connection with FIGS. 3-4. Advantageously, providing one-way valves in assemblies removable from the valve assembly 9 may allow for easier insertion and removal of such valves from the valve assembly 9.

Figure 12:
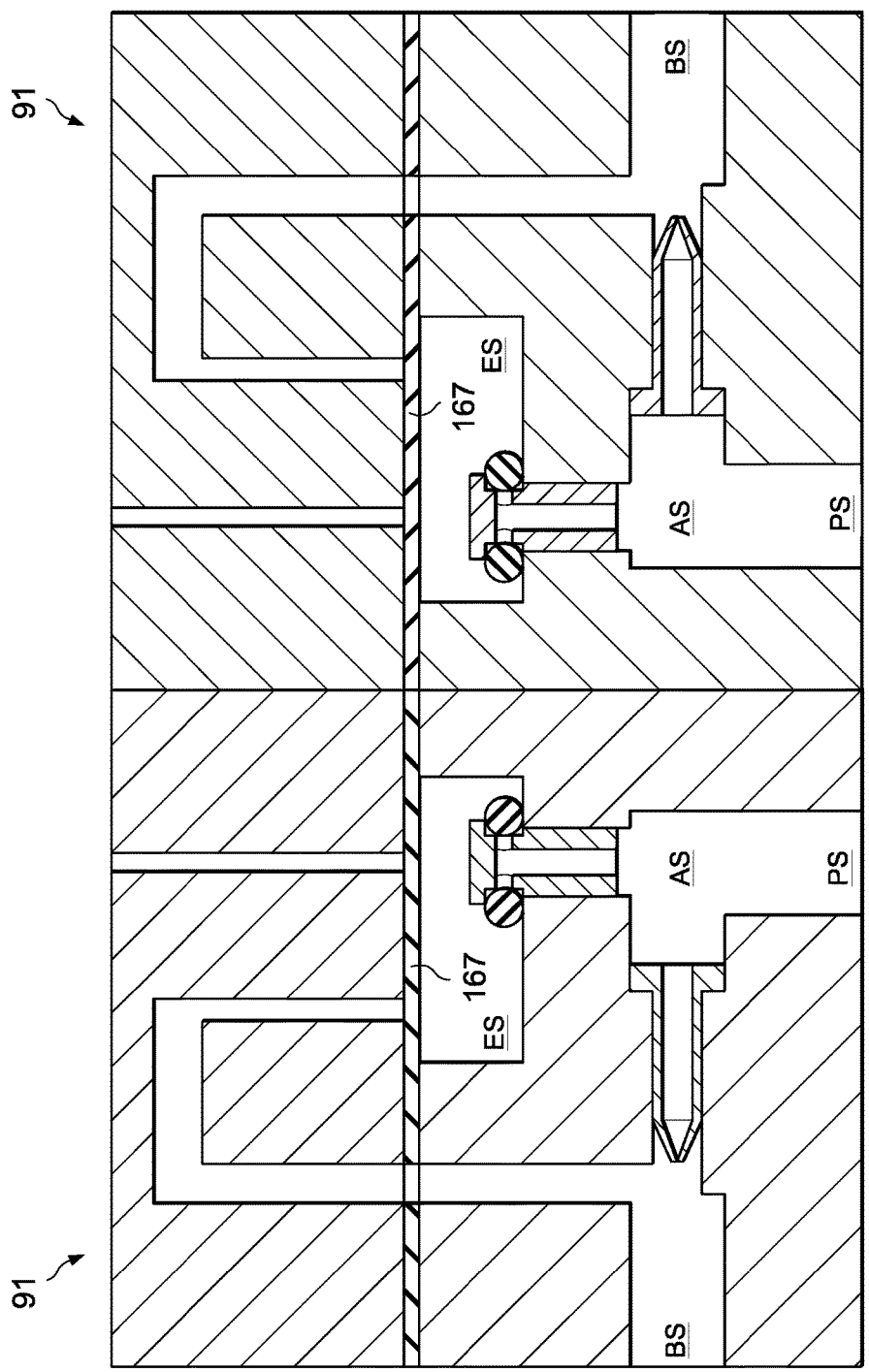
FIG. 12 illustrates one embodiment comprising two single-port assemblies connected for use with two vehicle tires.

As may be seen in the embodiment of FIG. 12, a plurality of single-port valve assemblies 91, such as that of FIG. 5, may be arranged to provide valved fluid flow to more than one tire (not shown).

Figure 13A:
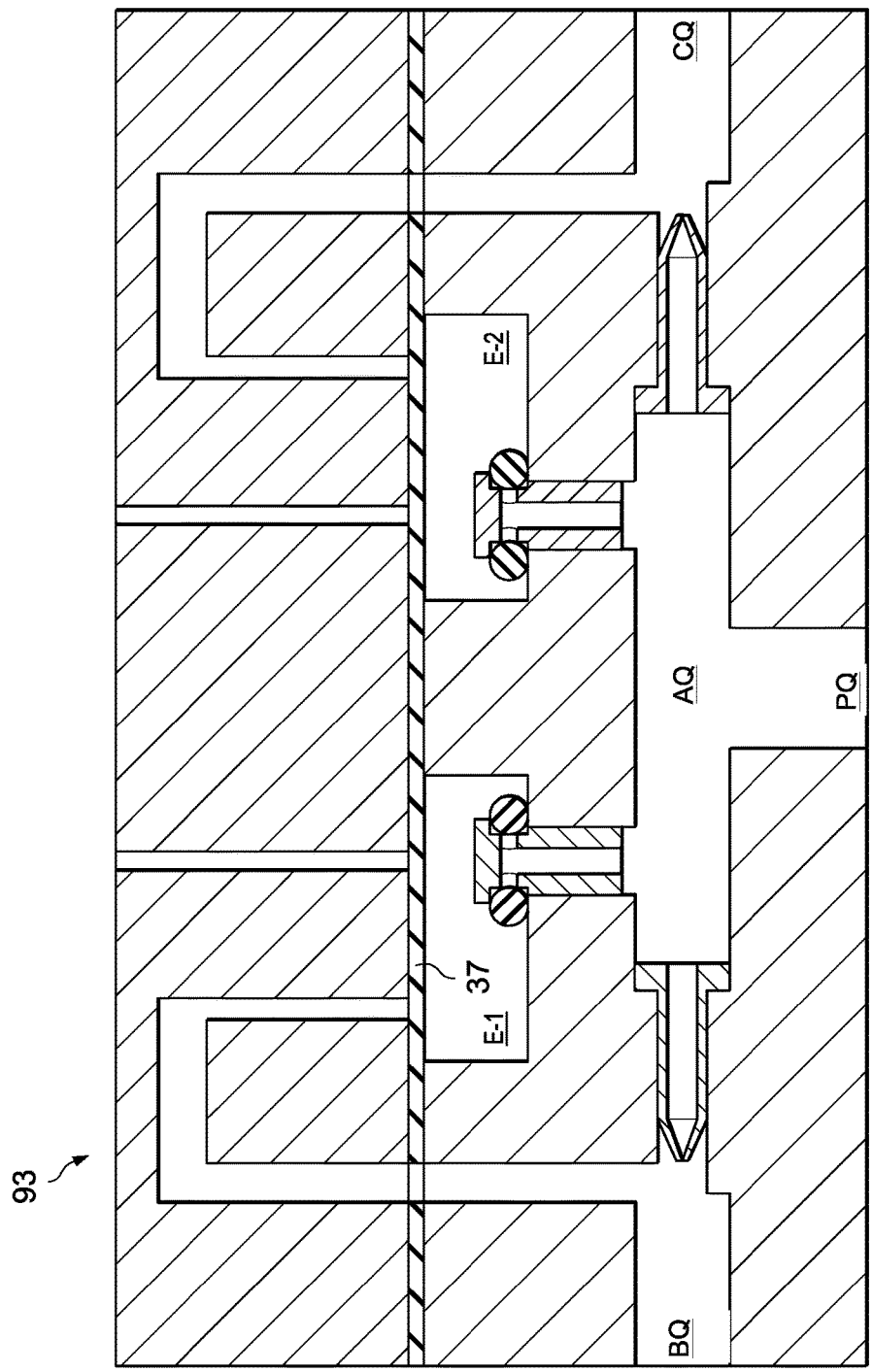
FIG. 13A illustrates one embodiment comprising two single-port assemblies comprising a single unit of manufacture for use with two vehicle tires, and having a single fluid inlet.
Figure 13B:
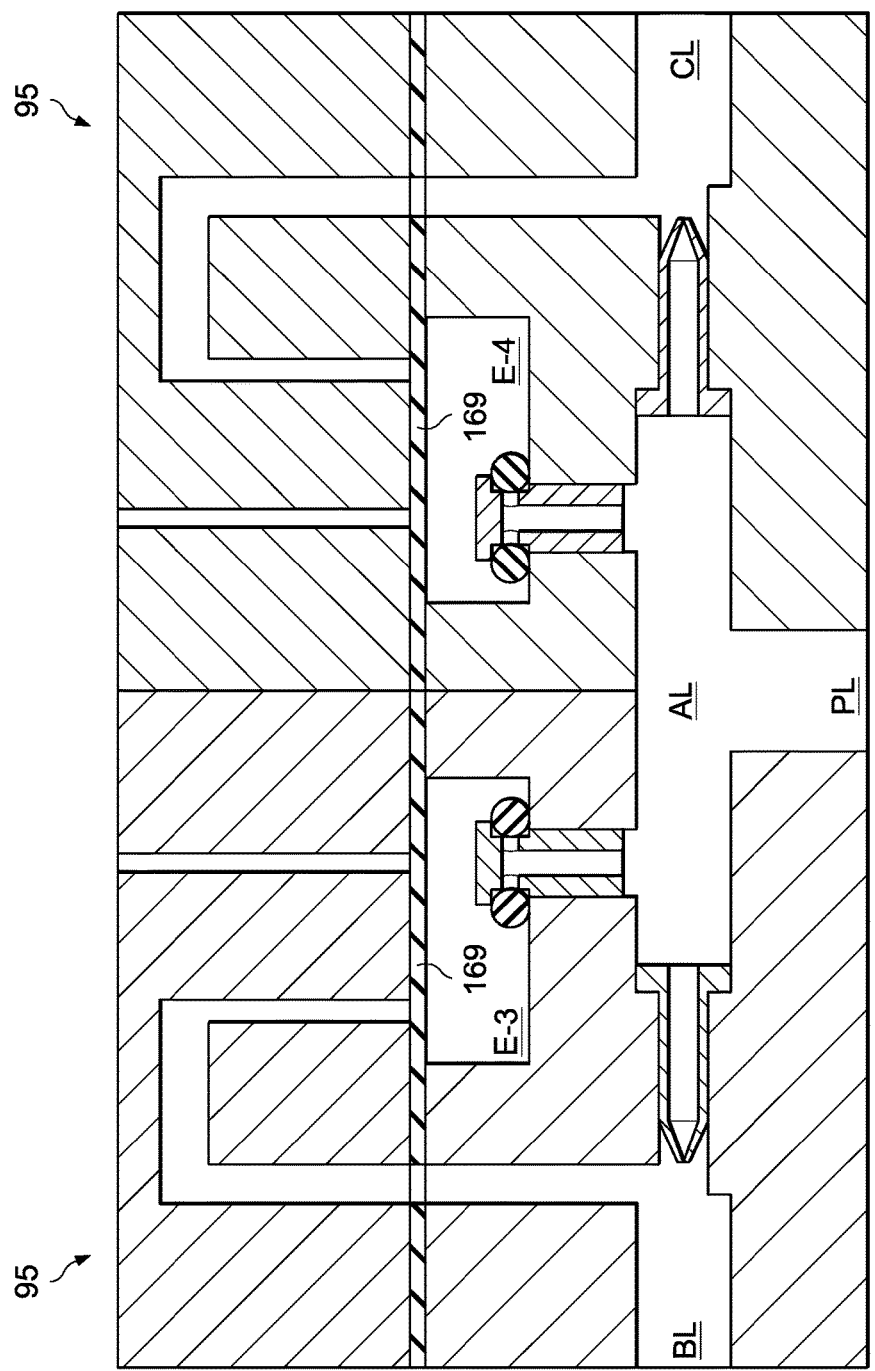
FIG. 13B illustrates one embodiment comprising two single-port assemblies connected for use with two vehicle tires, and having a single fluid inlet.

In the embodiment of FIG. 13A, a valve assembly 93 may be provided with a plurality of fluid chambers E, with fluid chamber E-1 and fluid chamber E-2 corresponding to a port BQ and a port CQ, respectively. Fluid chamber AQ may provide pressurized fluid to fluid chambers E-1 and E-2. The valve assembly of FIG. 13A may operate similarly as the embodiment of FIG. 12, except where pressurized fluid may be provided at a single inlet PQ rather than multiple inlets. FIG. 13B illustrates a similar embodiment, but comprising more than one assembly.

Figure 14:
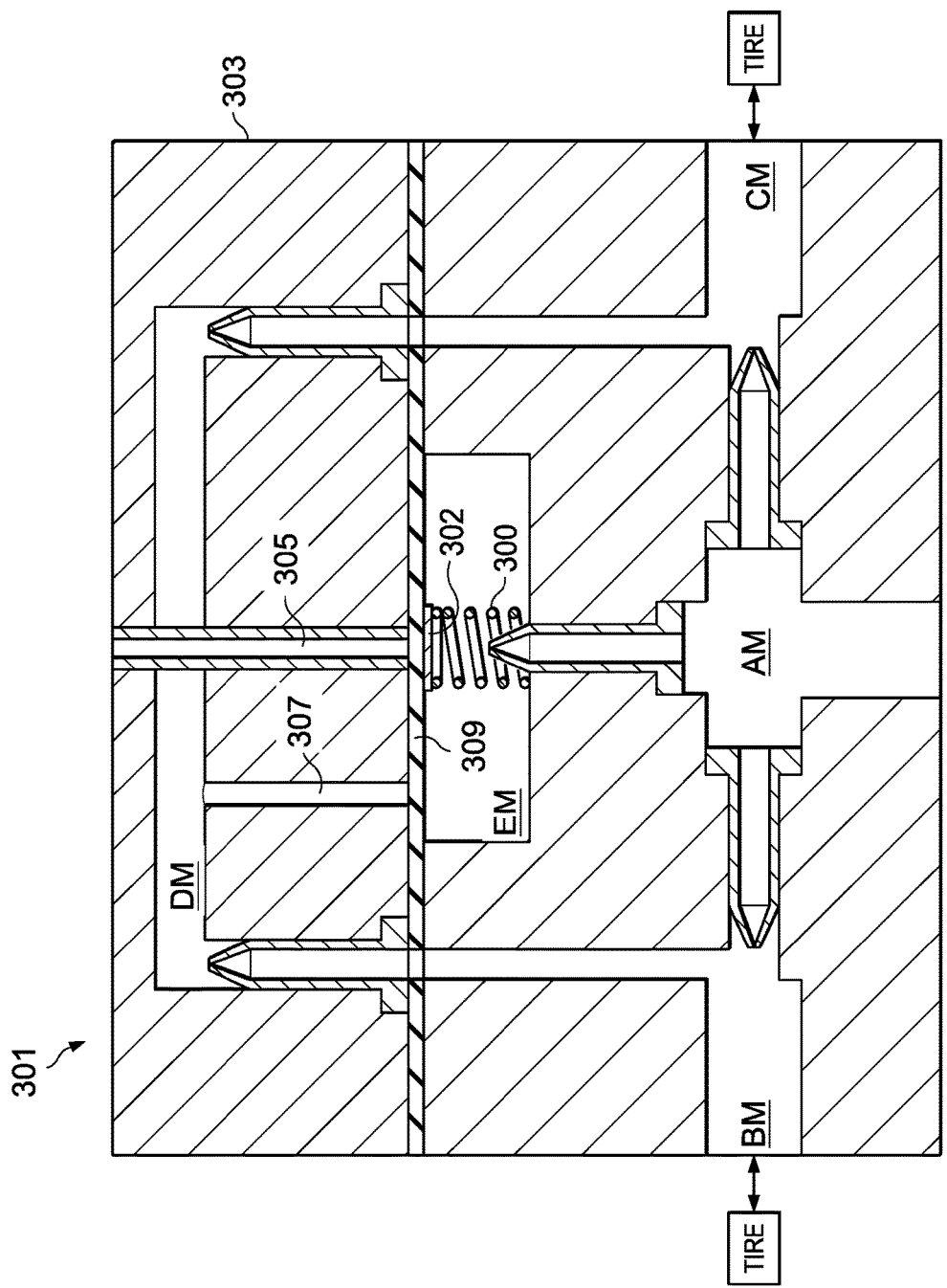
FIG. 14 illustrates one embodiment of a multi-port valve assembly comprising an upper block, a lower block, a diaphragm, spring and a plurality of one-way valves.

As may be seen in the embodiment of FIG. 14, a spring 300 or other vibration damping device may be disposed in fluid chamber AM so as to co-act with diaphragm 309. So disposed, the spring may reduce or eliminate vibration of diaphragm against the upper valve body 303. Vibration of the diaphragm may occur from road conditions, or jarring forces while at rest, or fluid pressure impulses. Vibrational movement of the diaphragm may allow fluid to flow from relief channel 307 to vent 305 even when there is little to no pressure imbalance between fluid chambers AM and EM, thus deflating tires (not shown) connected to ports BM and CM. The spring may provide a relatively light force, e.g., equivalent of 1-5 psi, against the diaphragm 16. A buffer 302 may be disposed between the spring 300 and the diaphragm 16 so as to reduce wear. In some embodiments, the elasticity of the diaphragm may allow for a pressure imbalance of 0-3 psi between fluid chambers A and D. A spring may increase that pressure imbalance by a further 15 psi. Ideally, the one or more one-way valves, diaphragm and optional spring should allow for overpressurized tires to deflate to <10 psi over the fluid pressure in chamber A.

Figure 15:
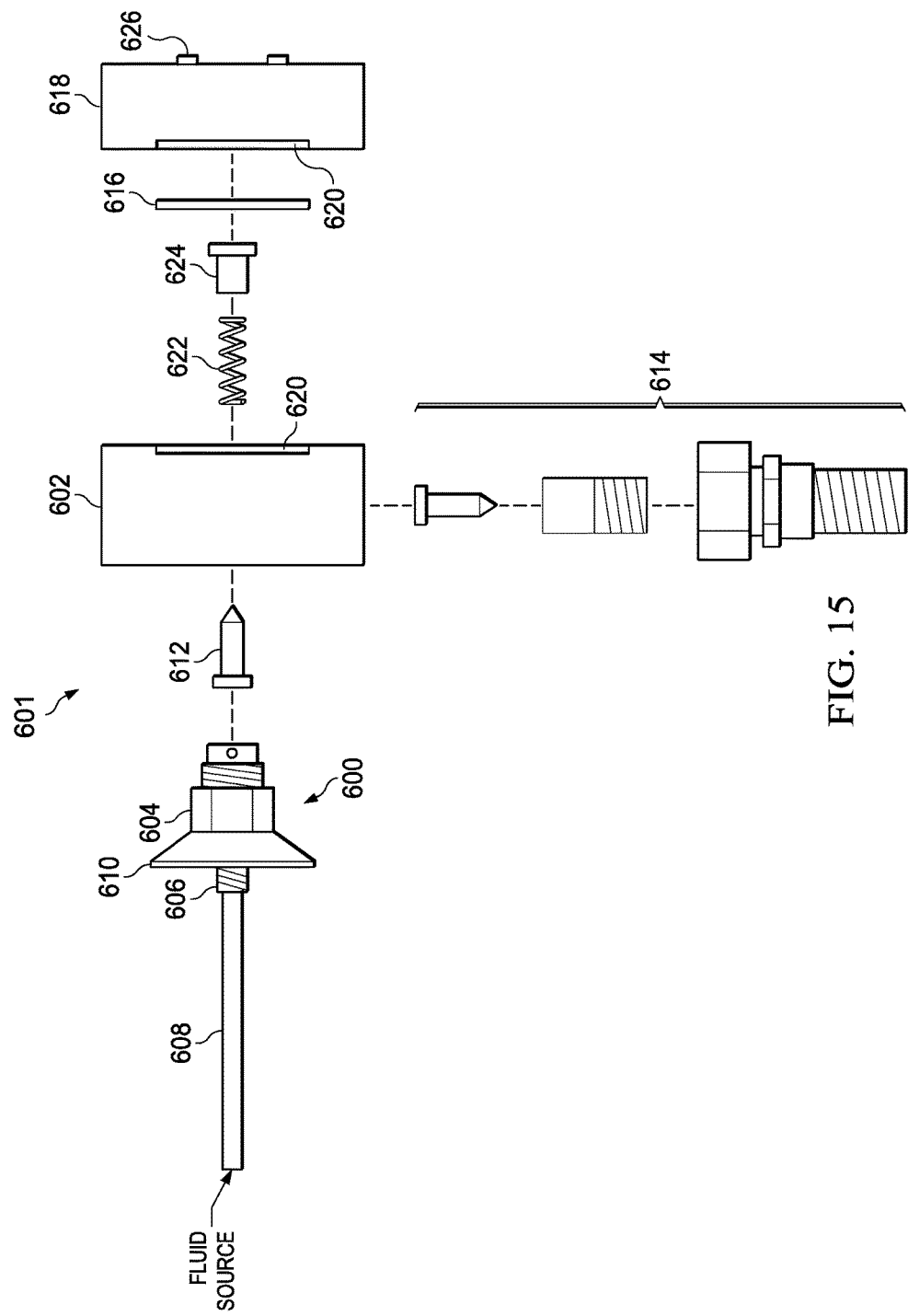
FIG. 15 illustrates a further embodiment of a multi-port valve assembly.

FIG. 15 discloses a single-tire embodiment comprising a disassembled view of a valve assembly 601. A rotary union assembly 600 similar to the rotary union assembly of FIG. 11 may be removably connected to a lower valve body 602. The rotary union assembly 600 may comprise a rotary union body 604 and a telescope cap 606 that may retain one end of a tubular member (608), a lip-seal or other elastomeric seal (not shown) and a bearing (not shown) in the rotary union body 604. An elastomeric flange 610 may be further provided to ventably seal hubcap vent holes (not shown) when the valve assembly 10 is mounted to a hubcap in the manner described in connection with FIG. 10. The rotary union assembly 600 may, when connected to the lower valve body 602, retain a one-way valve 612 in the lower valve body as described in connection with the one-way valve 26 of FIGS. 10 and 11.

Similarly, a port assembly 614 as described in connection with FIGS. 10 and 11 may be provided. A diaphragm 616 may be sandwiched between the lower valve body and upper valve body 618. In the embodiment of FIG. 15, the diaphragm may comprise a smaller maximum dimension than the valve assembly, and may be disposed in a corresponding seat 620 formed in the valve assembly 10. A spring 622 and spring cap 624 may be used, as described in connection with FIG. 14 for vibration dampening. The valve assembly 601 may be removably assembled by bolts 626 or other suitable means. A multiple-port embodiment may be similarly constructed according to the teachings contained herein.

Although the disclosed subject matter and its advantages have been described in detail, it should be understood that various changes, substitutions and alterations can be made herein without departing from the invention as defined by the appended claims. Moreover, the scope of the claimed subject matter is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

We claim:
1. A valve assembly comprising:
a lower block forming a first fluid chamber configured to receive pressurized fluid from a fluid pressure source, a second fluid chamber, and a first port configured for sealed communication with a first vehicle tire;
a first one-way valve disposed between the first fluid chamber and the second fluid chamber so as to allow fluid communication from the first fluid chamber to the second chamber;
a second one-way valve disposed between the first fluid chamber and the first port so as to allow fluid communication from the first fluid chamber to the first port;
an upper block forming a third fluid chamber, a first fluid channel in fluid communication with the third fluid chamber and with the first port, a relief channel in fluid communication with the third fluid chamber and a vent in fluid communication with atmosphere, wherein the relief channel and the vent each terminate at a common surface; and
a diaphragm disposed between the upper block and the lower block, the diaphragm having a first side disposed against the common surface, and having an opposing second side forming a wall of the second fluid chamber, such that when fluid pressure in the third fluid chamber is approximately equal to fluid pressure in the second fluid chamber, the diaphragm may substantially seal the relief channel and the vent from fluid communication therebetween, and when fluid pressure in the third fluid chamber exceeds fluid pressure in the second fluid chamber, the diaphragm may flex away from the relief channel and the vent so as to allow fluid to flow from the relief channel to the vent.

2. The valve assembly of claim 1, further comprising:
the lower block forming a second port configured for sealed communication with a second vehicle tire;
a third one-way valve disposed between the first fluid chamber and the second port so as to allow fluid communication from the first fluid chamber to the second port;
the upper block forming a second fluid channel in fluid communication with the third fluid chamber;
a fourth one-way valve disposed in the first fluid channel so as to allow fluid communication from the first port to the third fluid chamber; and
a fifth one-way valve disposed in the second fluid channel so as to allow fluid communication from the second port to the third fluid chamber.

3. The valve assembly of claim 2, wherein the vent further comprises a sixth one-way valve disposed so as to allow fluid to flow from the vent to atmosphere.

4. The valve assembly of claim 3, wherein the first and sixth one-way valves may each comprise an elastomeric gland sealing a fluid orifice, and the second, third, fourth and fifth one-way valves may each comprise an elastomeric duck-bill valve.

5. The valve assembly of claim 2, wherein each of the one-way valves comprises an elastomeric valve.

6. The valve assembly of claim 2, wherein the first one-way valve may comprise an elastomeric gland sealing a fluid orifice, and the second, third, fourth and fifth one-way valves may each comprise an elastomeric duck-bill valve.

7. The valve assembly of claim 1, further comprising a spring disposed between the lower block and the second side of the diaphragm.

8. A valve body comprising:
an inlet configured to receive pressurized fluid;
a first port;
a diaphragm comprising a first side and an opposing second side;
two one-way valves disposed as follows:
a first one-way valve disposed so as to allow fluid to flow from the inlet to the first side of the diaphragm, and
a second one-way valve disposed so as to allow fluid to flow from the inlet to the first port;
wherein the second side of the diaphragm is in fluid communication with the first port and with atmosphere, and the first side of the diaphragm is in fluid communication with the first one-way valve, such that when fluid pressure in the first port approximately equals fluid pressure at the first one-way valve, the diaphragm substantially seals the first port from atmosphere, and when fluid pressure in the first port exceeds fluid pressure at the first one-way valve, the diaphragm may flex to allow fluid to flow from the first port to atmosphere.

9. The valve body of claim 8, further comprising:
a second port;
three one-way valves disposed as follows:
a third one-way valve disposed so as to allow fluid to flow from the inlet to the second port,
a fourth one-way valve disposed so as to allow fluid to flow from the first port to the second side of the diaphragm, and
a fifth one-way valve disposed so as to allow fluid to flow from the second port to the second side of the diaphragm.

10. A rotary union comprising:
a tubular member;
a valve body sealingly connected to and rotatable with respect to the tubular member, the valve body comprising:
an inlet configured to receive pressurized fluid;
a first port;
a diaphragm comprising a first side and an opposing second side;
a first one-way valve disposed so as to allow fluid to flow from the inlet to the first side of the diaphragm; and
a second one-way valve disposed so as to allow fluid to flow from the inlet to the first port;
wherein the second side of the diaphragm is in fluid communication with the first port and with atmosphere, and the first side of the diaphragm is in fluid communication with the first one-way valve, such that when fluid pressure in the first port approximately equals fluid pressure at the first one-way valve, the diaphragm substantially seals the first port from atmosphere, and when fluid pressure in the first port exceeds the fluid pressure at the first one-way valve, the diaphragm may flex to allow fluid to flow from the first port to atmosphere.

11. The rotary union of claim 10, wherein an elastomeric seal provides the sealing connection of the tubular member to the valve body.

12. The rotary union of claim 11, wherein the elastomeric seal is one of an o-ring and a lip seal disposed around the tubular member so as to form an annular sealing connection between the tubular member and the valve body.

13. The rotary union of claim 10, wherein a face seal provides the sealing connection of the tubular member to the valve body.

14. The rotary union of claim 13, the face seal comprising a graphite member disposed within the inlet, a rigid member sealingly coupled to the tubular member, and a spring disposed within the inlet so as to urge the graphite member toward the rigid member.

15. The rotary union of claim 10, wherein the valve body is part of a vehicle hub cap.

16. The rotary union of claim 10 further comprising:
a second port;
three one-way valves disposed as follows:
a third one-way valve disposed so as to allow fluid to flow from the inlet to the second port,
a fourth one-way valve disposed so as to allow fluid to flow from the first port to the second side of the diaphragm, and
a fifth one-way valve disposed so as to allow fluid to flow from the second port to the second side of the diaphragm.

* * * * *